United States Patent [19]
Corporon et al.

[11] Patent Number: 6,006,414
[45] Date of Patent: Dec. 28, 1999

[54] FLOATING SPRING NUT FOR THREADED FASTENERS

[75] Inventors: Max A. Corporon, Rochester Hills; Norman B. Robbins, Davison; Brett G. Bamford, Livonia, all of Mich.

[73] Assignee: DaimlerChrysler Corporation, Auburn Hills, Mich.

[21] Appl. No.: 09/243,909

[22] Filed: Feb. 3, 1999

[51] Int. Cl.⁶ .............................. B23P 11/02; F16B 37/02
[52] U.S. Cl. ....................... 29/525.02; 411/112; 411/175; 29/525.11
[58] Field of Search ........................... 411/111, 112, 174, 411/175, 970, 999; 403/408.1; 29/525.11, 525.12, 525.02

[56] References Cited

U.S. PATENT DOCUMENTS

| | | |
|---|---|---|
| 3,426,818 | 2/1969 | Derby . |
| 4,684,305 | 8/1987 | Dubost ..................................... 411/174 |
| 4,755,090 | 7/1988 | Macfee, Jr. et al. . |
| 4,798,507 | 1/1989 | Olah . |
| 4,955,772 | 9/1990 | Reck ...................................... 411/175 |
| 5,039,264 | 8/1991 | Benn ...................................... 411/175 |
| 5,493,085 | 2/1996 | Kolberg et al. . |
| 5,707,192 | 1/1998 | Vortriede et al. ........................ 411/175 |

*Primary Examiner*—Neill Wilson
*Attorney, Agent, or Firm*—Kenneth H. Maclean

[57] ABSTRACT

A one-piece floating spring nut that has overlying upper and lower flattened leaves that extend from separated free ends into connection with a u-shaped spring hinge that resiliently joins the arms at their inboard ends. The upper leaf has a centralized nut locating and retaining collar extruded therefrom that also serves as a guide and through passage for a threaded fastener. The lower leaf has an extruded sleeve portion aligned with the locating and retaining collar, which is internally threaded to thredly receive the threaded fastener. The locating and retaining collar has a generally cylindrical configuration that extends with clearance into an opening in a support member to retain the spring nut in a pre-assembled position on the support member. The collar further cooperates with the edge of the enlarged opening to establish the amount of adjustment that the nut can float relative to the support. The float permits the nut to be adjusted on its support so that it can be aligned with an opening in the article being attached to the support by threaded fasteners that thread in to the sleeve portion of the nut.

1 Claim, 2 Drawing Sheets

FLOATING SPRING NUT FOR THREADED FASTENERS

TECHNICAL FIELD

This invention relates to spring nuts for threaded fasteners and more particularly to a new and improved one-piece spring nut having upper and lower flattened leaves or arms connected at adjacent ends by a u-shaped hinge so that they are folded on one another and are adapted to receive and grip a support structure therebetween. The upper leaf has a fastener receiving collar depending therefrom adapted to loosely fit into an enlarged opening in the supporting structure. This allows the limited adjustment of the nut relative to the support structure for the improved alignment and attachment of a component to the support structure. The lower leaf or arm has a depending and internally threaded sleeve that is aligned with the collar that threadingly receives the fastener.

BACKGROUND ART

Prior to the present invention, various spring nut units have been devised to be preassembled onto support structures to subsequently receive threaded fasteners so that another structure can be attached thereto. These units include a wide arrangement of J and U type spring nuts to function with a variety of threaded fasteners. U.S. Pat. No. 3,426,818 issued Feb. 11, 1969 to MT Derby for Yielding Nut Retainer and U.S. Pat. No. 4,798,507 issued Jan 17, 1989 to B. Otah for Sheet Metal U-Nut disclose some examples of prior art spring nuts.

While such spring nuts generally meet requirements for basic attachment purposes, they do not meet new and higher standards for improved assembly of different components to one another particularly where the different components are produced in quality with large limit stack or tolerances. The resilient retainer ring "R" of the prior art spring nut "N" of FIG. 3B securely holds the spring nut in an installed and nonfloating position in the locating hole or opening "O" in support "S" and further reduces the ramping of the nut on the support and thereby the misalignment of the opening in a panel being attached with the threaded retainer "T" of the nut.

In contrast to prior art fixed nut constructions, the present invention is drawn to a new and improved floating spring nut having an extruded adjustment limiter collar extending downwardly from the upper spring leaf that fits into an enlarged fastener receiving opening in the support that allows limited adjustment of the nut on the support or a first component so that a second component can be aligned therewith and securely fastened thereto with a threaded fastener. The spring nut of this invention is generally retained in any position by the collar and spring action of the upper and lower leaves or arms on a supporting component. The nut after appropriate adjustment efficiently receives and guides a threaded fastener into threaded connection with the nut so that the components can be readily connected to one another by the fastener extending through aligned holes in the components.

More particularly, the floating spring nut of this invention is, in one preferred embodiment, generally U shaped in cross section, provides improved retention and adjustment in its fastening plane and features a cylindrical locating and retaining adjustment collar instead of an inclined resilient locating and retaining ring found on a typical prior art U nut. However, the collar of this floating U nut fits with some clearance in the locating hole of the prior construction of FIG. 3B so that there is some float for adjustment purposes. However, the locating hole in the support for the floating nut preferably has a sufficiently larger tolerance diameter wise to provide additional clearance in any direction in its plane for optimized float of the spring nut. With such larger diameter holes, a relatively large tolerance zone is established in which the nut can be adjusted in the plane of the support component.

The ability of the spring nut to float provides greater flexibility in assembly and connection of a wide range of different and mass-produced components to one another. This invention accordingly enhances the assembly of structures from various sub-components manufactured with large tolerance and eases the effect of manufacturing tolerance stack-ups This adjustability is important to the proper installation and location of many components, particularly finishing components where positioning and adjusting trim panels and other structures is often needed for close fits.

A feature of this invention is in the new and improved locating and retaining collar extruded or otherwise formed in one of the leaves of the spring nut. This collar in cooperation with the edge of the hole in the support establishes the distance that the spring nut is allowed to float.

Moreover the present invention is easily used with a wider range of thickness in support structures and provides assured alignment of the fastener opening provided by the collar in the upper arm with the screw receiving sleeve in the lower arm. This invention accordingly provides a new and improved method of fastening components to one another having a wide tolerance range These and other features, objects and advantages of this invention will be more apparent from the following detailed description and drawings in which.

Figure 4:
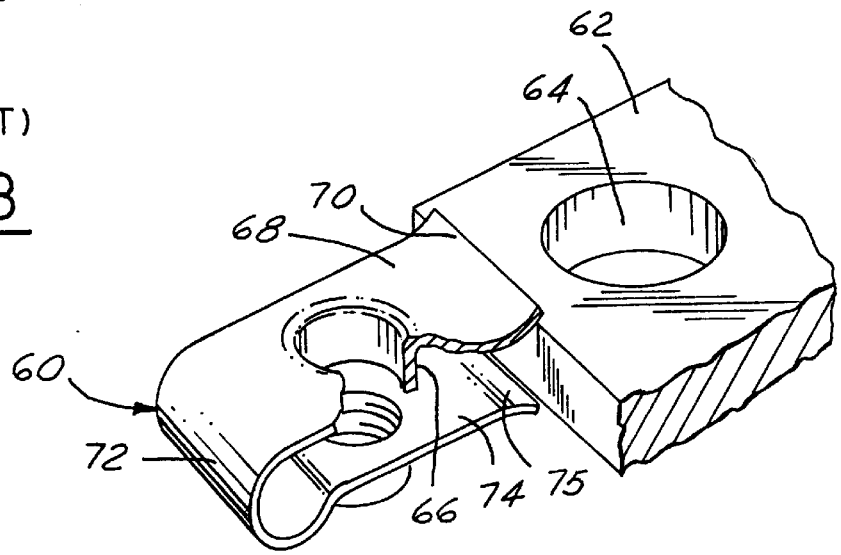
FIG. 4 is another pictorial view of the floating spring of FIG. 3a partly torn away and being installed on a fixed component mounted on the frame of FIG. 1.
Figure 5:
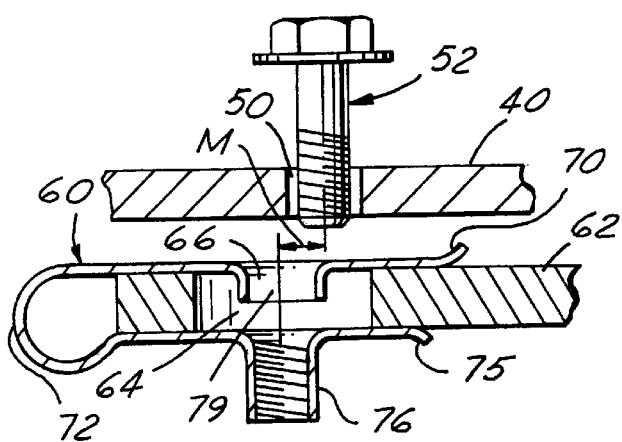

FIG. 5. is a cross sectional view of the floating spring of FIG. 4 in a misaligned position on the fixed component and shows a cover component being secured to the fixed component of FIG. 4.

Figure 6:
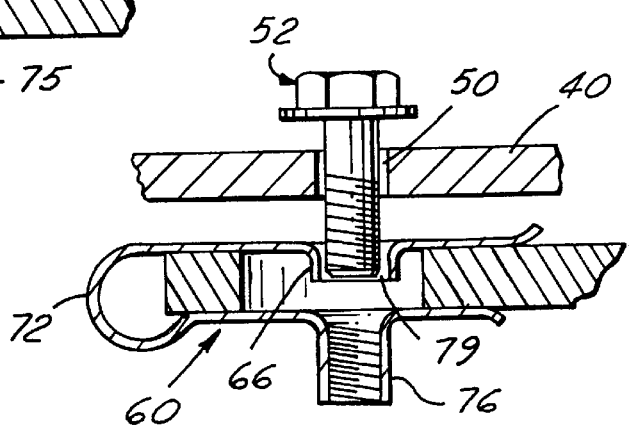

FIG. 6 is another view similar to FIG. 5 illustrating the floating spring moved to an aligned position and with the threaded fastener advanced to join components to the frame.

PREFERRED EMBODIMENT OF THE INVENTION

Figure 1:
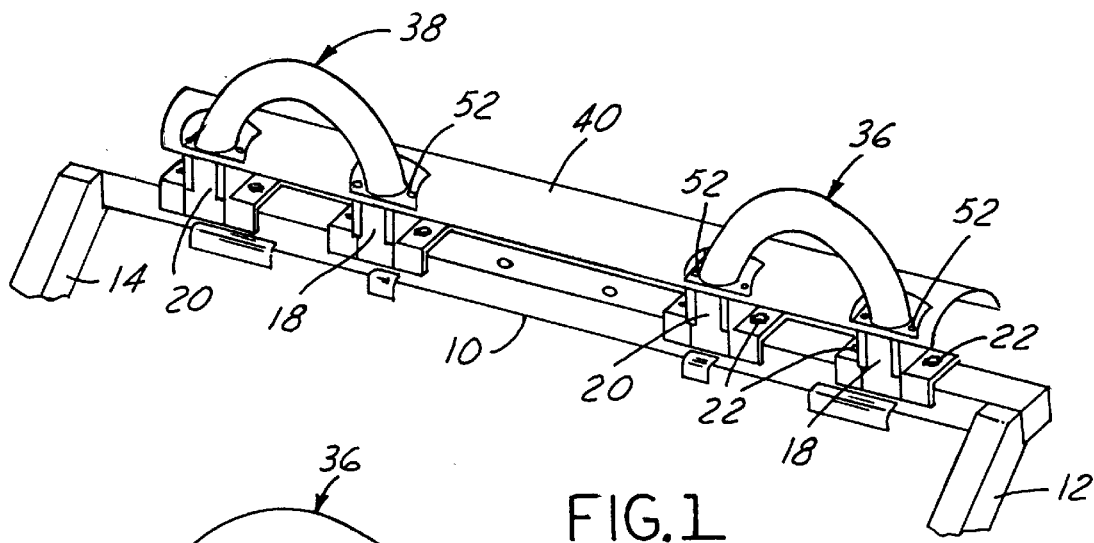
FIG. 1 is a pictorial view of a portion of the frame of an automotive vehicle with a trim cover attached thereto.
Figure 3A:
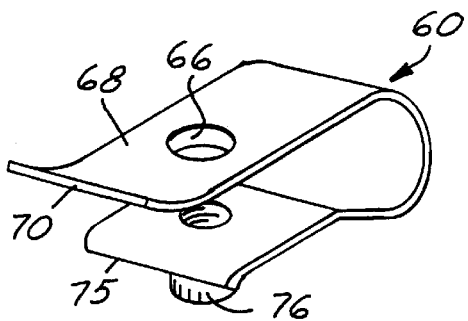
FIG. 3a is a pictorial view of a floating spring nut illustrating an embodiment of this invention.
Figure 2:
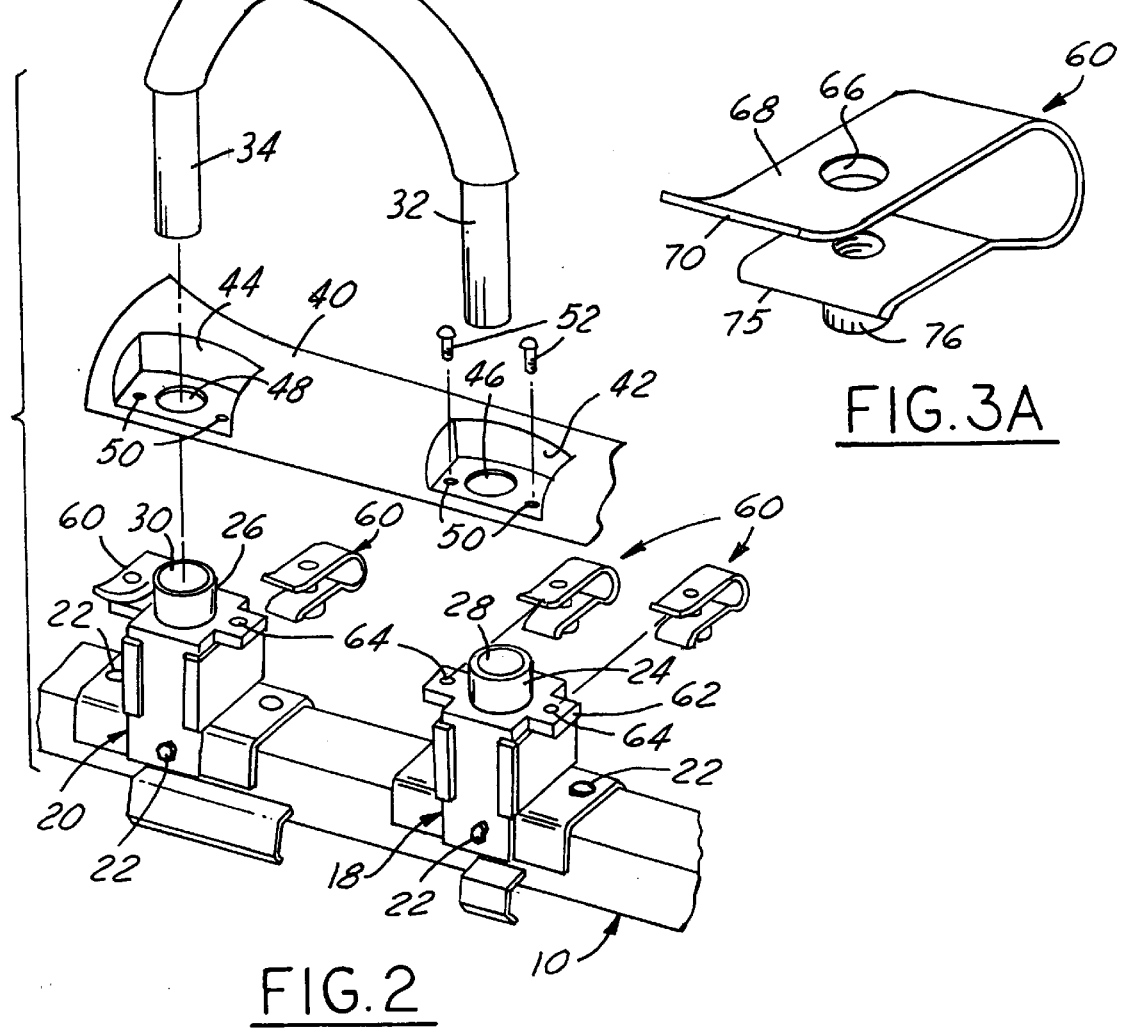
FIG. 2 is an exploded view of a portion of the view of FIG. 1.
Figure 3B:
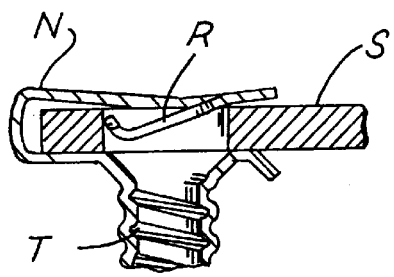
FIG. 3b is a cross sectional view of a prior art spring nut installed on a support.

Turning now in detail to the drawing there is shown in FIG. 1 a portion of the frame and attached finishing cover of a convertible sports-type vehicle. This frame includes a transversely extending bulkhead frame member 10 secured at opposite ends to left and right side frame members 12 and 14 that extend into connection with the side rails of the vehicle frame. As shown in FIGS. 1 and 2, a plurality of hoop receivers 18, and 20 are secured in predetermined and laterally spaced positions on the transverse bulkhead member 10 by threaded fasteners 22. The hoop receivers 18,20 have upwardly annular collars 24,26 respectively which define the upper extent of vertical bores 28,30 that receive the cylindrical ends 32,34 of the U-shaped sports hoops 36,38 which project above the back of the seats of the vehicle.

As also shown in FIGS. 1 and 2. The bulkhead support member 10 is covered and finished by an elongated shell-like bulkhead support cover 40 of plastics. The cover 40 has recesses 42,44 formed therein with flattened bottoms having openings 46,48 that receive the upstanding collars 24,26 of the hoop receivers 18,20. Fastener openings 50 on either side of the large diameter openings 46, 48 receive threaded fasteners 52 which extend through the openings 50 in the support cover and into threaded connection with the floating U spring nuts 60 operatively mounted on the laterally extending support wings or ears 62 of the hoop receivers.

The hoop receivers have large diameter vertical openings 64 therein which receive the smaller diameter locating and retaining collars 66 of the nuts 60 that extends downwardly from the a centralized position in the top leaf or arm 68 of the spring nut 60. The top leaf of the spring nut extends from an upturned free end portion 70 to a rearward portion leading into a U-shaped hinge portion 72 that turns 180 degrees and leads into a lower flattened arm or leaf 74.

The lower leaf is a generally flattened member terminating in a downwardly extending free edge 75. Moreover the lower leaf has a downwardly extending and centralized sleeve 76 axially aligned with the locating and retaining collar 66. The lower sleeve 76 is internally threaded to operatively mesh with the helical thread of the shank portion of the threaded fasteners 52.

Spring nuts 60 can be preassembled on the wings 62 of the hoop receivers 18, 20 in any suitable manner. For example, the nut can be installed on the wing 62 by placing the end opening or bite of the nut onto the edge of the wing of the hoop receiver. The spring nut is then rocked to spread the leaves apart and then slid horizontally until the locating collar snaps into the large diameter opening 64 in the wings of the hoop receivers. After all of the spring nuts have been installed on the wings of the hoop receivers, the cover is placed over the upper end of the collars of the hoop receivers. If because of limit stack or other reason there is some off center misalignment "m" of the opening 50 of the cover with the associated openings 64 of the hoop receiver wing such as shown in FIG. 5, the spring nuts can be readily floated or adjusted manually to the opening aligned position of FIG. 6. In some cases, such alignment may be accomplished by moving fastener 52 of FIG. 5 downwardly into the coned entrance of the collar 66 to cam the spring nut to the FIG. 6 position. When the alignment is achieved as in FIG. 6, the threaded fasteners 52 can be advanced through the openings 50 in the cover, the locating collar of the spring nut, the openings 64 in the wing 62 and then turned into threaded engagement with the internal threads of the lower sleeve 76. In the fully installed position, the threaded fastener is fully advanced through the threads collar until the cover is tightly secured on the hoop receivers.

With multiple fastening points established by the positions of the hoop receivers 18, 20 and with limit stack problems associated with the manufacture of such hoop receivers and with their varying position on the frame member 10, the spring nuts 50 can be adjusted for multiple alignment with the holes 50 of the cover. The cover can then be secured with the threaded fasteners 52. After cover installation, the sports hoops 36 and 38 are then installed into the bores and retained therein by suitable hidden fasteners.

The invention has been described in an illustrative manner, and it is to be understood that the terminology, which has been used, is intended to be in the nature of words of description rather than of limitation. Obviously, many modifications and variations of the present invention are possible in light of the above teachings. Therefore, it is to be understood that within the scope of the appended claims the invention may be practiced otherwise than as specifically described.

We claim:

1. A method of fastening a finishing component to a plurality of supporting members mounted at a plurality of laterally spaced support components secured to a support base comprising the steps of;

a. forming enlarged fastener receiving holes in each of the plurality of supporting members, b. providing a floating u nut with a locating and retaining collar depending from the upper arm thereof so that it extends into each of the fastener receiving holes c. adjusting the floating u nuts until they align with the holes in the finishing component and d. advancing threaded fasteners though the holes and turning such fasteners into the spring nuts until the finishing component is secured to the spaced components.

\* \* \* \* \*